(12) United States Patent
Klamm

(10) Patent No.: US 8,237,309 B2
(45) Date of Patent: Aug. 7, 2012

(54) ARRANGEMENT HAVING PARALLEL-CONNECTED DC POWER SUPPLY UNITS

(75) Inventor: Arnold Klamm, Kandel (DE)

(73) Assignee: Siemens AG, München (DE)

( * ) Notice: Subject to any disclaimer, the term of this patent is extended or adjusted under 35 U.S.C. 154(b) by 333 days.

(21) Appl. No.: 12/727,677

(22) Filed: Mar. 19, 2010

(65) Prior Publication Data

US 2010/0237705 A1    Sep. 23, 2010

(30) Foreign Application Priority Data

Mar. 20, 2009  (EP) ..................................... 09004052

(51) Int. Cl.
*H02J 7/36* (2006.01)
(52) U.S. Cl. .......... 307/53; 361/59; 361/93.6; 361/93.7; 361/94; 361/97
(58) Field of Classification Search .................... 307/53, 307/86, 87
See application file for complete search history.

(56) References Cited

U.S. PATENT DOCUMENTS

| 5,654,859 | A | * | 8/1997 | Shi | .................................. 361/66 |
| 5,798,578 | A | | 8/1998 | Thereze | |
| 6,130,813 | A | * | 10/2000 | Kates et al. | ................... 361/93.1 |
| 7,477,502 | B1 | * | 1/2009 | Faulkner et al. | ............. 361/93.7 |
| 7,751,168 | B2 | * | 7/2010 | Itakura | .......................... 361/93.9 |
| 2006/0139975 | A1 | * | 6/2006 | Huang | ........................... 363/65 |

FOREIGN PATENT DOCUMENTS

| DE | 10 2005 014 992 | 7/2006 |
| EP | 0 685 918 | 12/1995 |
| WO | WO 97/18612 | 5/1997 |

* cited by examiner

*Primary Examiner* — Rexford Barnie
*Assistant Examiner* — Toan Vu
(74) *Attorney, Agent, or Firm* — Cozen O'Connor

(57) ABSTRACT

An arrangement having DC power supply units connection parallel, wherein, the power supplies of the DC power supply units each generate a partial output current for supplying a load with a total output current. In accordance with the invention, an overload of power supply units when the power supply units are switched on and/or during their restart is largely avoided.

2 Claims, 1 Drawing Sheet

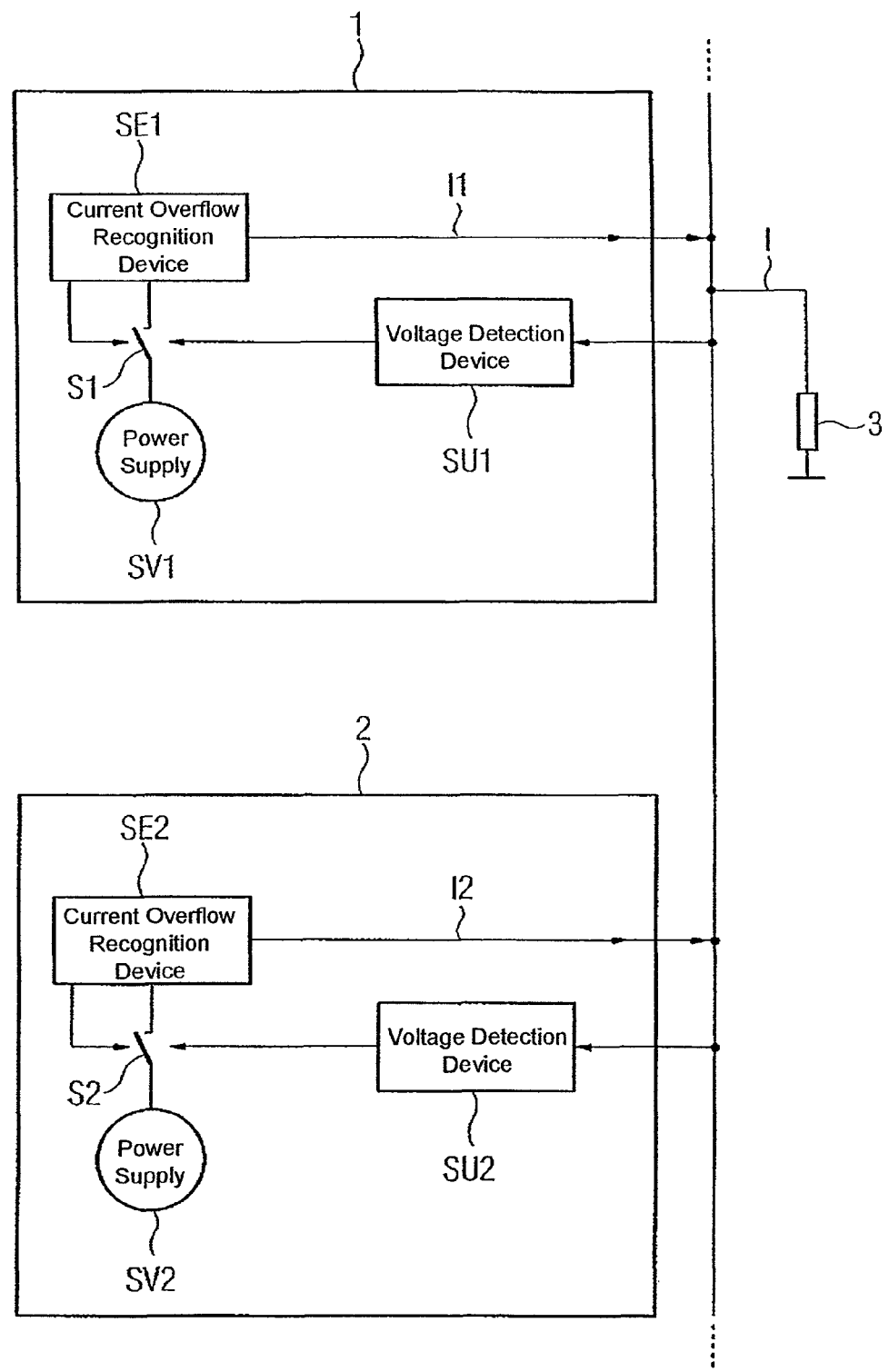

ARRANGEMENT HAVING PARALLEL-CONNECTED DC POWER SUPPLY UNITS

BACKGROUND OF THE INVENTION

1. Field of the Invention

The invention relates to power supplies and, more particularly, to an arrangement having parallel-connected DC power supply units, the power supplies of which each generate a partial output current for supplying a load with an overall output current. The invention further relates to a DC power supply unit which is suitable for use in such an arrangement.

2. Description of the Related Art

DE 10 2005 014 992 A1 discloses an arrangement, which is particularly suitable for use in automation technology. In such an arrangement, the respectively available output of the power supply units, which are provide to supply power to a load, is ideally added to form a total power. In the event that one of the parallel-connected power supply units is switched on first, it is highly likely here that this is overloaded since the total power for supplying the load exceeds the output of this power supply unit. As a result of the overload, the power supply unit switches off. Moreover, in the event that a further power supply unit of the arrangement is switched on during the switching off of the power supply unit and/or after it has been switched off, the further power supply unit also switches off due to the overload.

To largely prevent the power supply units, which are fed from a mains power supply and/or from a current source, from switching off, a shared switch can be provided, to which all power supply units are connected simultaneously. However, as the power supply units usually have different start-up characteristics, particularly due to a shared use of available power supply units with newly developed "compatible" power supply units, an overload during the start-up cannot be prevented. Furthermore, it is also difficult to use different current sources as energy sources of the respective power supply unit or to connect power supply units with different outputs and/or start-up characteristics in parallel.

SUMMARY OF THE INVENTION

It is therefore an object of the present invention to provide an arrangement that prevents an overload of power supply units during the switching-on of the power supply units and/or during their restart. Furthermore, a suitable DC power supply unit is provided, which is suitable for use in arrangement of this type.

This and other objects and advantages are achieved by a DC power supply unit in which different power supply units are advantageously allowed to be connected in parallel, e.g., with respect to their output and start-up behavior. Furthermore, a user does not need to take note of any operating instructions for switching on the power supply units and/or their switch actuation; overloads as a result of operating errors are largely eliminated. It is further possible to supply the parallel-connected power supply units from different sources; a supply in the form of a mains or battery supply is possible. It is also advantageous for a, usually error-prone, communication not to be needed between the power supply units to transmit information relating to the respective state of the power supply units. A restart of overloaded power supply units occurs automatically; it is not necessary for a user to have to take heed of special operating instructions.

In accordance with the invention, each power supply unit can establish a threshold voltage after switching on for a brief period of time, before this power supply unit switches off due to an overload current. Consequently, the period of time is selected such that the power supply unit is reliably undamaged during this period of time by the overload current. The threshold voltage is the voltage which the power supply unit can still maintain in the case of an overload current. For a power supply unit which supplies a maximum current of approximately 5 A with a supply voltage of 24V, the threshold voltage lies at approximately 1V. This threshold voltage uses a switched-off additional power supply unit to automatically switch on again, and likewise establish a threshold voltage. In other words, the threshold voltage of the power supply unit is provided to trigger the further power supply unit. This in turn triggers the switched-off power supply unit to switch itself on again as well, as a result of which the partial output currents of the two power supply units feed a connected load with a total output current. In the event that, e.g., (n=1, 2, ...) DC power supply units are used in parallel, (n−1) power supply units switch on and off until the n-th power supply unit switches on. All n power supply units then remain switched on and supply a connected load with a total current, which includes the sum of all partial currents of the power supply units. An arrangement of this type, comprising power supply units connected in parallel and a load, has properties whereby a single power supply unit can establish a threshold voltage to "trigger" further power supply units on the load for such a period of time until these are started up or also powered up again after an overload.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in more detail below with the aid of an exemplary embodiment with reference to the single FIGURE in the drawing, in which:

The FIGURE shows a schematic block diagram of an arrangement with parallel-connected power supply units for supplying power to a load in accordance with an embodiment of the invention.

DETAILED DESCRIPTION OF THE PRESENTLY PREFERRED EMBODIMENTS

The FIGURE shows a first and a second DC power supply unit 1, 2 that are provided to supply a load 3, the first power supply unit 1 of which has a power supply SV1 and the second power supply unit 2 of which has a power supply SV2. These power supplies SV1, SV2 are each configured to impress a partial output current I1, I2 onto the load 3. As a result, the load 3 can be supplied with a total output current I, which equals the sum of the partial output currents I1, I2. It should be appreciated that further power supply units can also be connected in parallel to supply the load with a suitable voltage and a total output current, which equals the sum of the partial output currents of these power supply units.

It is assumed below that initially the first power supply unit 1 and then the second power supply unit 2 is switched on. On account of only the first power supply unit 1 supplying the total current I, which exceeds its permissible maximum current, a current overload recognition device SE1 in this first power supply unit 1 switches off after a period of time of 0.5 to 3 seconds for instance. The switching off is herewith effected by this current overload recognition device SE1 opening a controllable switch S1, as a result of which the current supply is interrupted. The period of time is selected such that on the one hand during this period of time, the first power supply unit 1 is reliably undamaged by the overload current and, on the other hand, the power supply unit can still maintain a threshold voltage on the load 3 in the case of this overload current. After switching off, the first power supply unit 1 "waits" for a "spontaneous" voltage drop on the load 3. As the first power supply unit 1 has switched itself off, a voltage drop at this point in time can only be effected by an additional switched-on power supply unit. A voltage drop on the load 3 can be detected by a voltage detection device SU1 of the first power supply unit 1.

It is now assumed that the second power supply unit 2 is switched on when the first power supply unit 1 is switched off. In the event that the first power supply unit 1 is defective and can no longer switch itself on, the second power supply unit 2 alone supplies the total current I, which exceeds its permissible maximum current, with a current overload detection device SE2 of this second power supply unit 2 in turn switching itself off after a period of time of 0.5 to 3 seconds. The switching-off is effected by this current overload recognition device SE2, which opens a controllable switch S2, as a result of which the supply of the current I2 of the second power supply SV2 to the load 3 is interrupted. After the switching-off, the second power supply unit 2 likewise "waits" for a "spontaneous" voltage drop on the load 3.

In the event, however, that the first power supply unit 1 is not defective, the voltage detection device SU1 of the first power supply unit 1 recognizes a voltage drop on the load 3 caused by the second power supply unit 2. This voltage detection device SU1 closes the switch S1, as a result of which the first power supply SV1 feeds a partial output current I1 to the load 3. The total current I is obtained from the sum of the partial output currents I1 and I2, with both of these lying below the maximum currents of the power supplies SV1, SV2. The power supply unit 1 which is switched off as a result of an overload is therefore automatically started up again or powered up again.

In the present exemplary embodiment, it is assumed that the first power supply unit 1 is initially switched on and the second power supply unit 2 is finally connected thereto. It should be recognized that it is also possible to firstly switch on the second power supply unit 2 and then the first power supply unit 1. The second power supply unit 2 is switched on again in accordance with the described embodiment. Here, the second power supply unit 2 initially switches off as a result of an overload and "waits" for the load voltage to return. If the voltage detection device SU2 of the second power supply unit 2 identifies a voltage drop on the load 3 which is caused by the first power supply unit 1 connected thereto, the voltage detection device SU2 therefore closes the switch S2, as a result of which the second power supply SV2 feeds a partial output current I2 to the load 3. The second power supply unit 2 is therefore automatically started up again, or powered up again, and together with the partial output current I1 of the first power supply unit 1 provides the total current I for the load 3.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. An arrangement having a plurality of DC power supply units connected in parallel for supplying a load with an overall output current, each of said plural DC power supply units comprising:
    a power supply that generates a partial output current of the overall output current;
    a controllable switch by which the power supply feeds the partial output current to the load;
    a current overload recognition device which opens the controllable switch if the partial output current of the power supply exceeds a maximum current for a period of time during which a threshold voltage is established on the load, the threshold voltage comprising a voltage that the power supply can maintain upon occurrence of an overload current; and
    a voltage detection device which closes the controllable switch if the load voltage traverses the threshold voltage.

2. A DC power supply unit configured for connection in parallel with at least another DC power supply unit for supplying a load with an overall output current, said DC power supply unit comprising:
    a power supply that generates a partial output current of the overall output current;
    a controllable switch by which the power supply feeds the partial output current to the load;
    a current overload recognition device which opens the controllable switch if the partial output current of the power supply exceeds a maximum current for a period of time during which a threshold voltage is established on the load, the threshold voltage comprising a voltage which the power supply can maintain upon occurrence of an overload current; and
    a voltage detection device which closes the controllable switch if the load voltage traverses the threshold voltage.

* * * * *